June 25, 1929.  J. G. HANSEN ET AL  1,718,460
CHUTE DELIVERY MECHANISM FOR DUMP WAGONS
Filed Sept. 13, 1926
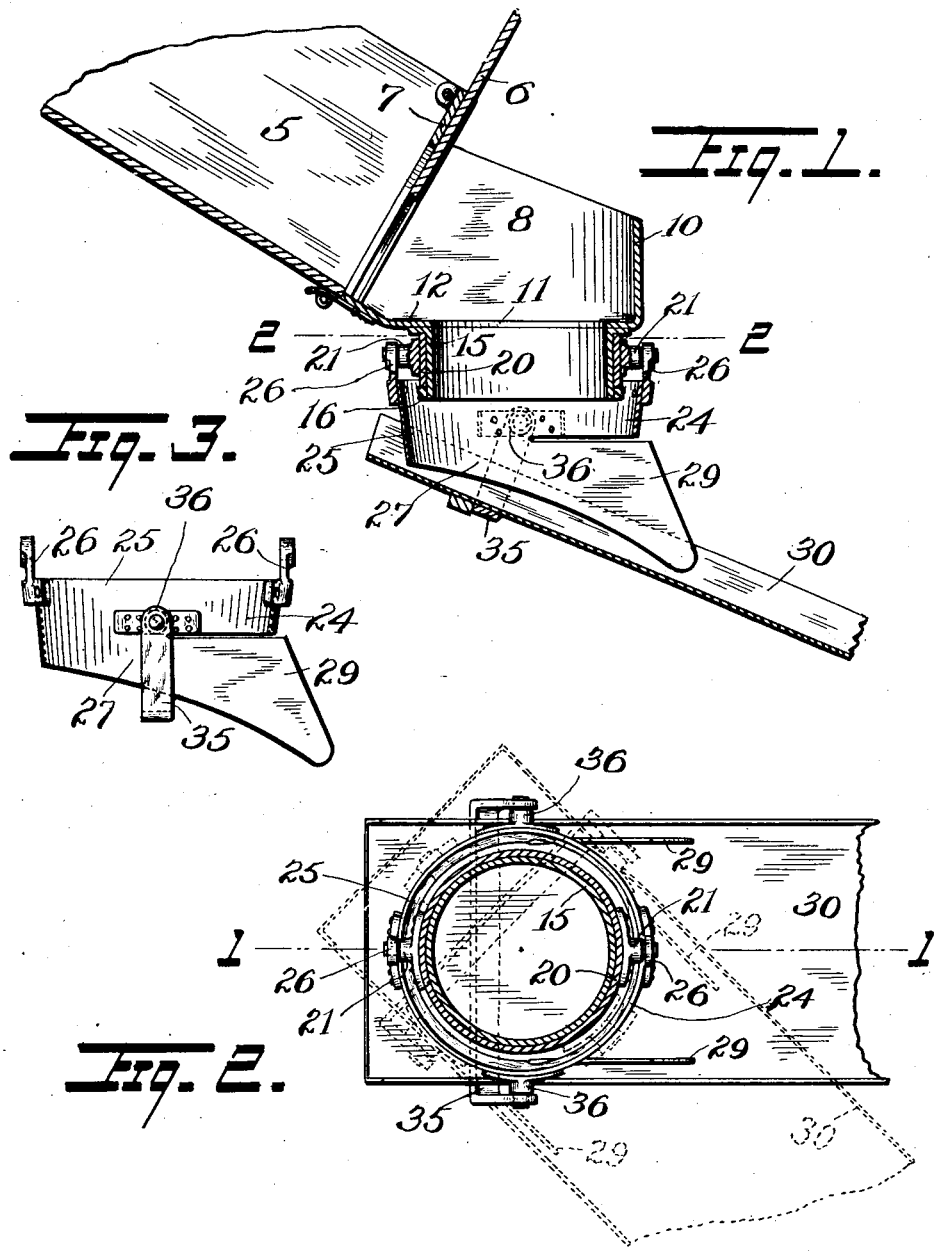
Julius Gustav Hansen, and
Walter Julius Hansen  INVENTORS
BY
ATTORNEYS.

Patented June 25, 1929.

1,718,460

UNITED STATES PATENT OFFICE.

JULIUS GUSTAV HANSEN, OF READING, AND WALTER JULIUS HANSEN, OF WYOMISSING, PENNSYLVANIA.

CHUTE-DELIVERY MECHANISM FOR DUMP WAGONS.

Application filed September 13, 1926. Serial No. 135,023.

Our invention relates to improved chute-delivery mechanism adapted for conveniently discharging coal or the like in any determined direction from the container body of a vehicle; and its consists essentially in providing a rotatable chute-supporting hopper in connection with a fixed discharge spout having a cylindrical bottom outlet so as to permit of properly setting the chute whatever incline is given to the body as fully set forth in connection with the accompanying drawings and clearly defined in the subjoined claims.

The drawings illustrate the invention as applied in preferred manner to a truck body such as is ordinarily employed for the delivery of coal to residences, where the lateral incline of the body as well as the direction and angle of delivery are apt to vary; Fig. 1 showing the applied mechanism in longitudinal section with the chute directed rearwardly from the container body; Fig. 2 being a corresponding plan view on the line 2—2 of Fig. 1, with another position of the discharge chute indicated in dotted lines; and Fig. 3 being a separate view of the rotatably carried chute-supporting hopper.

The end portion of a container body 5 is indicated in rearwardly inclined position adapted to fully discharge its contents through a gate 6 in its end wall 7, into a rearwardly extending discharge spout 8 fixed to the latter as usual.

In our improved construction this fixed spout 8 is provided with an end closure 10, and with a vertical discharge opening 11 in its bottom plate 12; the latter being preferably set at an angle to the container body so as to be approximately horizontal when said body is inclined, as indicated.

Depending from said apertured bottom plate 12 is a fixed cylindrical nozzle 15 registering with said opening 11, and having a circular flange 16 at its lower edge; and rotatably carried upon this fixed cylindrical nozzle is a hopper-carrying ring 20, having opposite trunnion supports 21, 21 for connection of the freely adjustable chute-supporting hopper 25.

The hopper 25 comprises a cylindrical portion 24 which loosely encircles the lower portion of the fixed nozzle 15 and the rotatable ring 20 thereon, and is provided with fixed brackets 26, 26 pivotally mounted upon said trunnion supports; and a lower nozzle portion 27 the cylindrical form of which is changed so as to provide a horizontal opening between parallel wall portions 29, 29, whereby material discharging from the nozzle into the chute 30 carried thereby, is left free to deliver through said chute.

The chute or delivery trough 30 is carried by the freely adjustable hopper, so as to be itself adjustably angled relative to the hopper though circularly movable with and constantly communicating with the latter; a chute-supporting bail 35 being pivotally mounted upon opposite exterior brackets 36, 36 on the hopper walls, and freely depending therefrom so as to permit the upper end of the chute 30 to be supported thereby as desired with the parallel wall portions 29, 29 of the nozzle depending into the adjustable chute somewhat so as to prevent side overflow of the discharging material.

As will be readily understood from the above description, my improved mechanism enables the chute 30 to be easily set in any direction from the bottom-discharge of the fixed spout on the container body, thus permitting delivery to any desired point relative to the discharging location of the latter; and the preferred construction specifically set forth may obviously be varied within the invention as defined in the claims.

What we claim is:

1. In combination with a vehicle body having a gated discharge spout with a bottom outlet, a communicating cylindrical nozzle fixed to said spout, a rotatable ring mounted on said nozzle so as to rotate in a fixed plane relative thereto, a hopper pivotally carried by said rotatable ring, and a chute-supporting bale suspended from said hopper on pivotal supports arranged at right angles to the hopper supporting pivots.

2. In combination with a dump wagon body having a gated discharge extension provided with a bottom outlet and a depending cylindrical nozzle; a rotatable ring mounted on said nozzle to rotate in a fixed plane at right angles to the axis of the latter, a cylindrical hopper mounted upon pivotal supports on said rotatable ring and having a lateral opening with parallel chute-engaging wall extensions, and a chute-supporting bale suspended from said hopper on pivotal supports arranged at right angles to the hopper supporting pivots.

In testimony whereof we affix our signatures.

JULIUS GUSTAV HANSEN.
WALTER JULIUS HANSEN.